(12) United States Patent
Matsuzaka et al.

(10) Patent No.: US 7,756,302 B2
(45) Date of Patent: Jul. 13, 2010

(54) METHOD AND APPARATUS FOR DETECTING FACE ORIENTATION, AND RECORDING MEDIUM HAVING RECORDED PROGRAM FOR EXECUTING THE METHOD

(75) Inventors: Kenji Matsuzaka, Nagano (JP); Tatsuya Hosoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1076 days.

(21) Appl. No.: 11/446,406

(22) Filed: Jun. 2, 2006

(65) Prior Publication Data

US 2006/0279640 A1 Dec. 14, 2006

(30) Foreign Application Priority Data

Jun. 2, 2005 (JP) ............................. P2005-162217

(51) Int. Cl.
*G06K 9/00* (2006.01)

(52) U.S. Cl. ...................... 382/118; 382/117; 382/164; 382/165

(58) Field of Classification Search ................. 382/118, 382/117, 164, 165
See application file for complete search history.

(56) References Cited

U.S. PATENT DOCUMENTS

2001/0019620 A1* 9/2001 Nagai et al. .................. 382/104
2006/0133654 A1* 6/2006 Nakanishi et al. ........... 382/118

FOREIGN PATENT DOCUMENTS

JP 2001-291108 10/2001
JP 2004-94491 3/2004

* cited by examiner

*Primary Examiner*—Matthew C Bella
*Assistant Examiner*—Mike Rahmjoo
(74) *Attorney, Agent, or Firm*—Martine Penilla & Gencarella, LLP

(57) ABSTRACT

In order to detect an orientation of a human face included in an image consisted of a plurality of pixels, a face region is determined within the image so as to include the human face. A plurality of detecting regions are set so as to be adjacent to the face region. A plurality of first amounts are acquired. Each of the first amount is characteristic to one of the detecting regions. The first amounts are compared to each other to judge the orientation.

10 Claims, 10 Drawing Sheets

METHOD AND APPARATUS FOR DETECTING FACE ORIENTATION, AND RECORDING MEDIUM HAVING RECORDED PROGRAM FOR EXECUTING THE METHOD

BACKGROUND OF THE INVENTION

The present invention relates to a method and an apparatus for detecting the orientation of a face from captured images, and relates to a program product including a recording medium having recorded a program for executing the above method.

A method of detecting the orientation of a face from captured images has been known which creates a plurality of inclined face images from a sample image of the full face and searches the most similar region to an image to be detected among the plurality of inclined face images. That is, pattern matching is performed using the plurality of inclined face images, and the inclination of the face in an image having the highest similarity is set to the orientation of the face in the image to be detected. Such a technique is disclosed in Japanese Patent Publication Nos. 2001-291108A and 2004-94491A.

However, in the above publications, a processing for creating the plurality of inclined face images and a processing for calculating the similarity in the plurality of inclined face images need to be performed, which causes the amount of calculation to be increased and a process to be duplicated.

SUMMARY OF THE INVENTION

It is therefore an object of the present invention is to provide a method and an apparatus for detecting the orientation of a face from captured images which can easily detect the orientation of a face.

It is also an object of the present invention is to provide a program product including a recording medium having recorded a program for executing the above method.

In order to achieve the above objects, according to the invention, there is provided a method of detecting an orientation of a human face included in an image consisted of a plurality of pixels, comprising:
  determining a face region within the image so as to include the human face;
  setting a plurality of detecting regions so as to be adjacent to the face region;
  acquiring a plurality of first amounts each of which is characteristic to one of the detecting regions; and
  comparing the first amounts to each other to judge the orientation.

With this configuration, the orientation can be detected by a simple process, that is, the comparison of the first amounts. Therefore, the amount of calculation of a process can be reduced, as compared with the conventional techniques.

The method may further comprise acquiring a second amount indicative of a color component of the face region. The first amounts may be acquired with reference to the second amount.

With this configuration, the orientation can be properly detected according to the color of the face region. Therefore, it is possible to cope with each image or a difference in color of the face regions by persons.

Further, even though a background of the image has a similar color to the color of the human face, the orientation of the human face can be accurately detected.

Each of the first amounts may be number of pixels having the color component.

With this configuration, the amount of calculation required for acquiring the first amounts can be reduced.

The orientation may be detected with reference to one of the detecting regions having the largest one of the first amounts.

With this configuration, the direction from the detecting region having the largest first amount to the face region is judged as the orientation of the human face. For example, when an image of a face facing leftward is captured, the left side of the face is captured on the right side of the face region, and thus the first amount of the detecting region set on the right side becomes large. Therefore, the orientation can be judged as a direction from the detecting region having the largest first amount to the face region, that is oriented leftward. Further, since the orientation is obtained through the simple judgment, that is, the comparison of the first amounts, the amount of calculation of a process can be reduced.

The face region may be placed between the detecting regions.

With this configuration, it is possible to detect whether the face is oriented leftward or rightward, for example.

The method may further comprise determining whether a ratio of the first amounts is less than a threshold value. It may be detected that the human face is oriented forward when the ratio is less than the threshold value.

With this configuration, the orientation of the face can be detected from leftward, rightward, and forward, for example.

The detecting regions may be set with reference to a size of the face region.

With this configuration, the orientation can be properly detected, regardless of the size of the human face in the image.

The method may further comprise trimming a part of the image which is determined in accordance with the judged orientation.

With this configuration, an image having a composition according to the judged orientation can be obtained.

According to the invention, there is also provided an apparatus, adapted to detect an orientation of a human face included in an image consisted of a plurality of pixels, comprising:
  a face region detector, operable to determine a face region within the image so as to include the human face;
  a detecting region provider, operable to set a plurality of detecting regions so as to be adjacent to the face region;
  a calculator, operable to acquire a plurality of first amounts each of which is characteristic to one of the detecting regions; and
  a judge, operable to compare the first amounts to each other to judge the orientation.

According to the invention, there is also provided a program product comprising a recording medium having recorded a computer-readable program operable to cause a computer to execute the above method.

As the recording medium, for example, magnetic disks such as flexible disks or the like, optical disks such as CD-R or DVD-R, magneto-optical disks such as MO or the like may be adopted.

According to the invention, there is also provided a method of detecting an orientation of a human face included in an image consisted of a plurality of pixels, comprising:
  determining a face region within the image so as to include the human face;
  setting a plurality of detecting regions such that the face region is placed therebetween;
  acquiring a plurality of first amounts each of which is characteristic to one of the detecting regions;

comparing the first amounts to each other to judge the orientation; and trimming a part of the image which is determined in accordance with the judged orientation.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the invention will be described below in detail with reference to the accompanying drawings.

Figure 1:
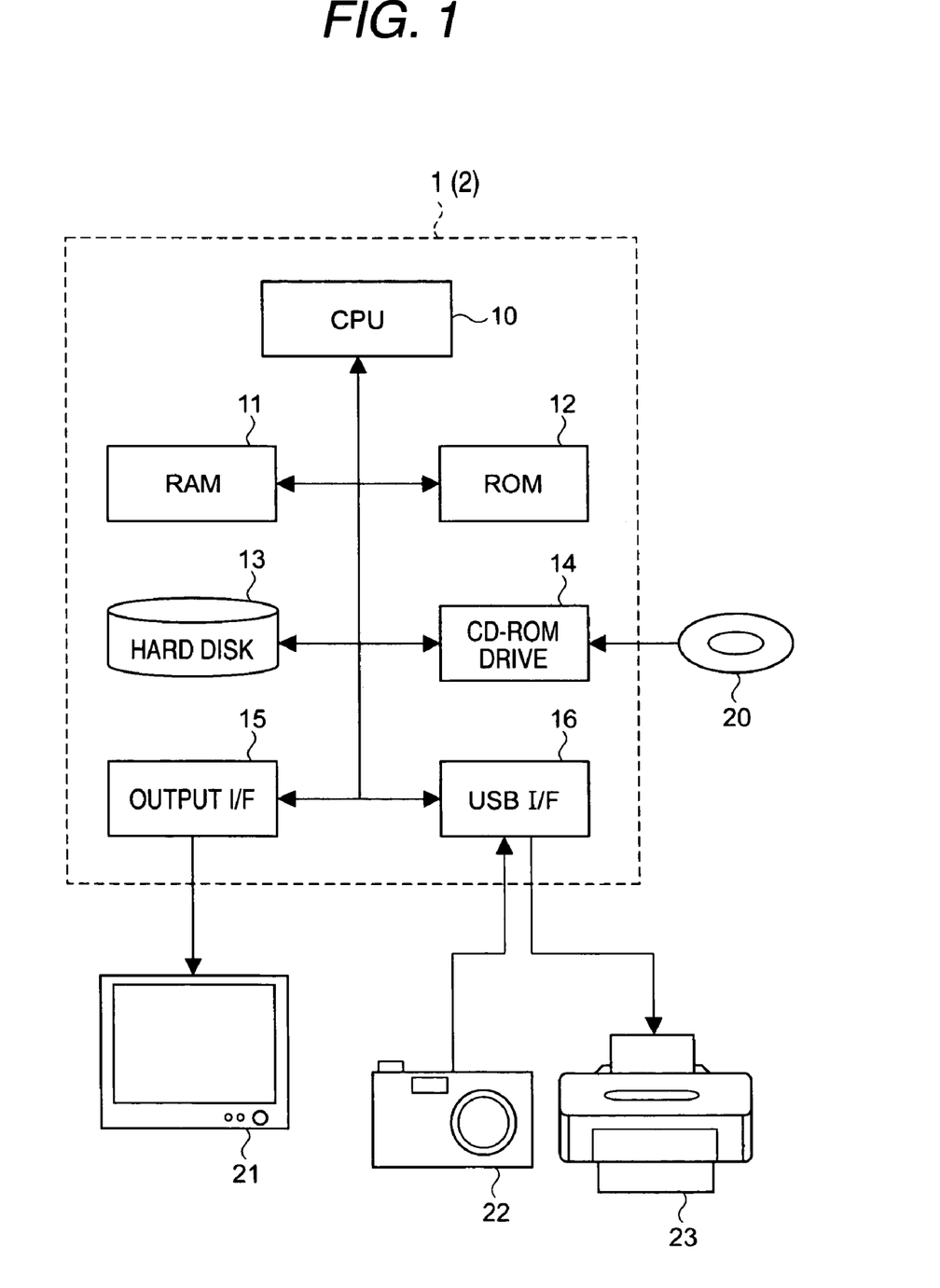
FIG. 1 is a diagram showing the configuration of an image processing system according to one embodiment of the invention.

As shown in FIG. 1, an image processing system according to one embodiment of the invention comprises a general-use computer 1. The computer 1 is connected to a digital still camera 22 serving as an information inputting device, a liquid crystal display 21 and an external apparatus, such as a printer 23 serving as an information outputting device.

The computer 1 has a RAM 11, a ROM 12, and a hard disk 13 that serve as general-use working memories, a CD-ROM drive 14, an output interface (output I/F) 15 that outputs images to the liquid crystal display 21, a USB interface (USB I/F) 16 that is connected to the digital still camera 22 and the printer 23, and a CPU 10 that controls the operations of these devices.

Under management of a predetermined operating system, a predetermined application program (face orientation detecting program) is read out from the ROM 12 or the hard disk 13, and the CPU 10 executes the program. When the face orientation detecting program is run, and the computer 1 starts serving as a face orientation detecting apparatus 2 that detects the orientation of a face according to an image captured by the digital still camera 22, for example.

The program may be stored in the ROM 12 or the hard disk 13 in advance. Alliteratively, the program may be recorded on a CD-ROM 20 to be then provided to a user. In this case, the program is read out by the CD-ROM drive 14 and is stored in the hard disk 13 provided in the computer 1. Besides, the program may be supplied to the computer 1 through a network, such as Internet or the like.

Figure 2:
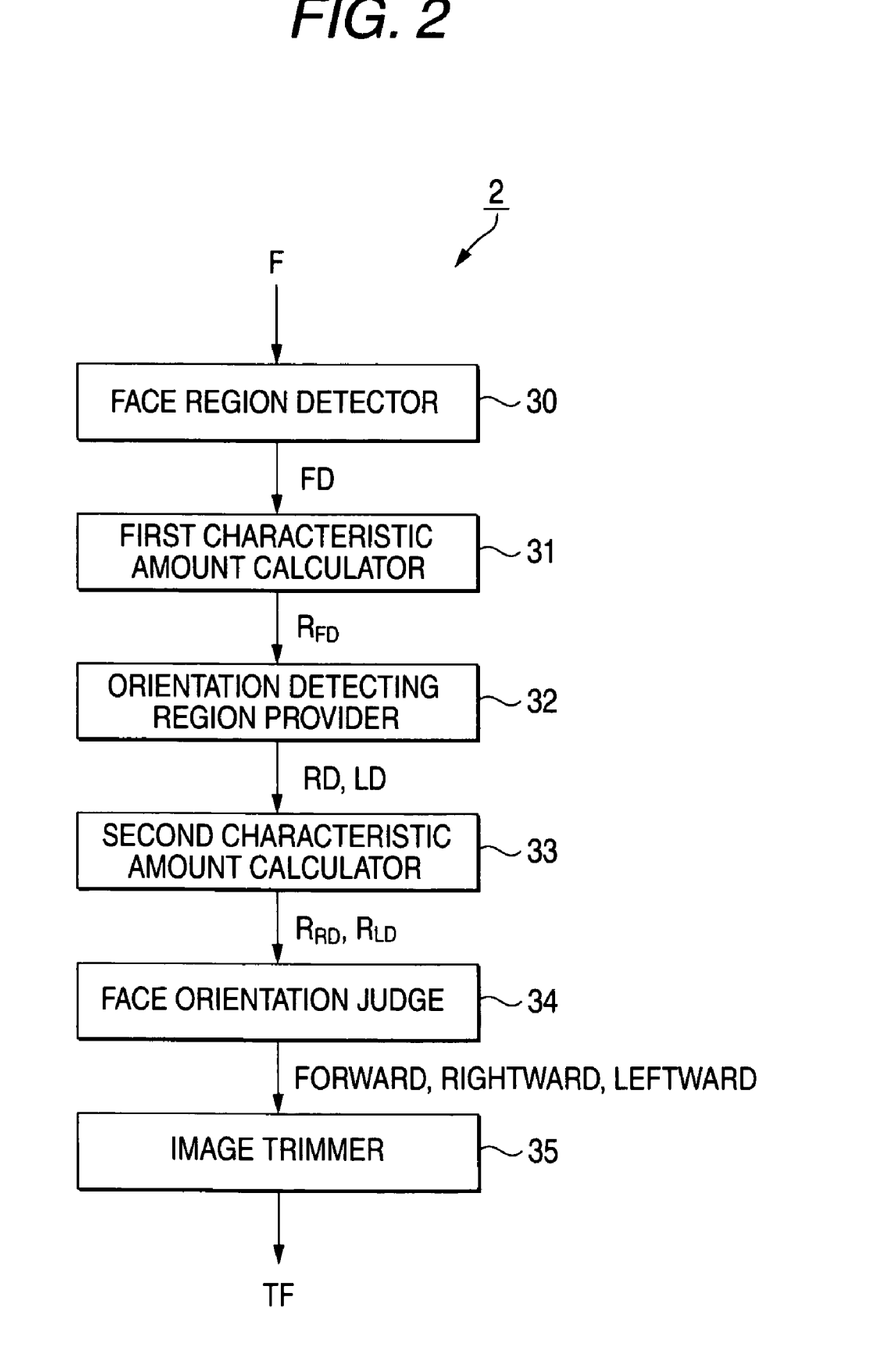
FIG. 2 is a block diagram showing the configuration of a face orientation detecting apparatus in the image processing system.

Next, the face orientation detecting apparatus 2 will be described. As shown in FIG. 2, the face orientation detecting apparatus 2 comprises: a face region detector 30 that detects a face region FD acquired from a captured input image F; a first characteristic amount calculator 31 that acquires a characteristic amount $R_{FD}$ of the face region FD; an orientation detecting region provider 32 that sets orientation detecting regions RD, LD on left and right sides of the face region FD; a second characteristic amount calculator 33 that acquires characteristic amounts $R_{RD}$, $R_{LD}$ of the orientation detecting regions RD, LD; a face orientation judge 34 that judges the orientation of the captured face from the characteristic amounts $R_{RD}$, $R_{LD}$ of the orientation detecting regions RD, LD; and an image trimmer 35 that trims an image according to the judged orientation of the face. In this configuration, the individual functions are implemented by the CPU 10 of the computer 1 in connection with the RAM 11 and the hard disk 13. Hereinafter, the respective members of the face orientation detecting apparatus 2 will be described.

In this embodiment, the face region detector 30 detects a rectangular region including the face, that is, eyes, a nose, and a mouth from the input image F using a known method, such as pattern matching or the like. For example, in a case where an image including the face is given in advance as a template, the face region FD can be detected by performing template matching and searching a region having the highest similarity to the template. A method of detecting the face region FD is not limited to this configuration. For example, the face region FD may be specified by calculating the positions of the eyes, the mouth, and so on through pattern matching. Further, the face region FD may be determined on the basis of the color or the shape of the outline of the face region.

The first characteristic amount 31 acquires a characteristic amount $R_{FD}$ of the face region from the image of the detected face region. FD. Specifically, image data of the input image F, such as RGB data or yCbCr data, may be converted into data of an HSV colorimetric system. Then, the characteristic amount $R_{FD}$ of the face region is calculated using the value of a hue H. The details of this method will be described below.

The orientation detecting region provider 32 sets the orientation detecting regions on the left and right sides of the face region. FD in the image region of the input image F. Herein after, the orientation detecting region set in a region on the left side of the face region is referred to as a rightward detecting region RD, and the orientation detecting region set in a region on the right side of the face region is referred to as a leftward detecting region LD. The judgment that the face is oriented rightward is based on the rightward detecting region RD set in the region on the left side of the face region FD.

The second characteristic amount calculator 33 acquires characteristic amounts from the orientation detecting regions RD, FD. Here, the characteristic amounts are separately calculated for the leftward and rightward detecting regions RD, FD. That is, a characteristic amount $R_{RD}$ is acquired from the rightward detecting region RD, and a characteristic amount $R_{LD}$ is acquired from the leftward detecting region LD.

The face orientation judge 34 compares the characteristic amount $R_{RD}$ of the rightward detecting region RD and the characteristic amount $R_{LD}$ of the leftward detecting region LD, and judges the orientation of the face according to the captured input image F from leftward, rightward, or forward.

The image trimmer 35 determines an image region to be trimmed from the input image F according to the judged orientation of the face and trims an image TF having a composition according to the orientation of the face.

As described above, the face orientation detecting apparatus 2 of this embodiment compares the characteristic amounts $R_{RD}$ and $R_{LD}$ obtained from the rightward detecting region RD and the leftward detecting region LD set on the left and right sides of the face region FD and judges whether the orientation of the face according to the captured input image F is oriented rightward, leftward, or forward. In addition, the trimmed image TF having the composition according to the orientation of the face is acquired from the input image F.

Figure 3:
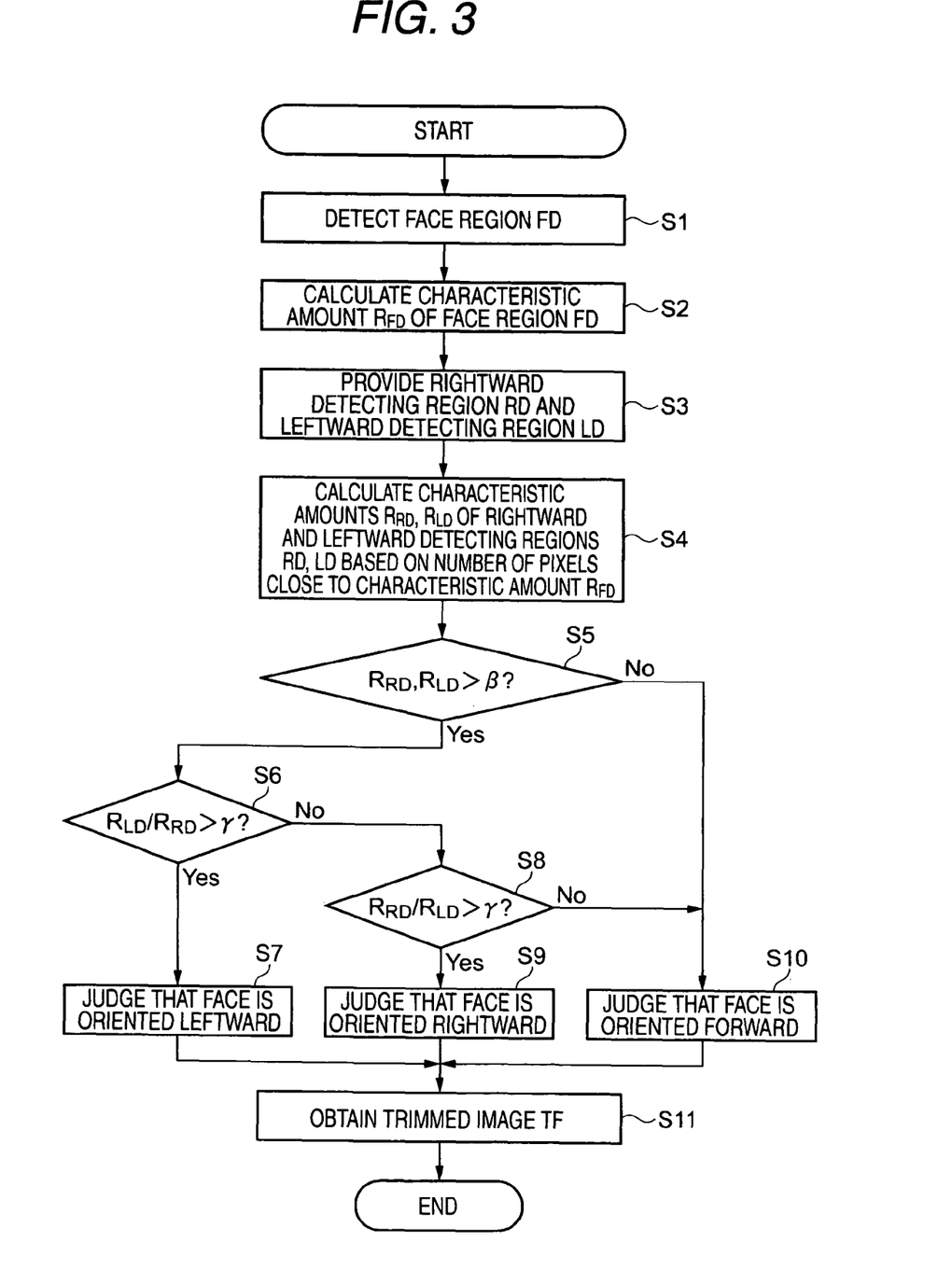
FIG. 3 is a flowchart showing a face orientation detecting processing performed by the face orientation detecting apparatus.

Next, a face orientation detecting processing performed by the face orientation detecting apparatus 2 will be described in detail with reference to the flow chart shown in FIG. 3.

If the input image F is input and a processing for detecting the orientation of the face starts, first, at Step S1 the face region detector 30 detects the face region FD from the input image F. Here, the CPU 10 reads out a template TP, which serves as a sample of the face region FD, from the hard disk 13 and performs template matching on the input image F, such that the face region FD representing the human face including the eyes and mouth is acquired. Image data of the acquired face region FD is stored in the RAM 11.

Figure 4:
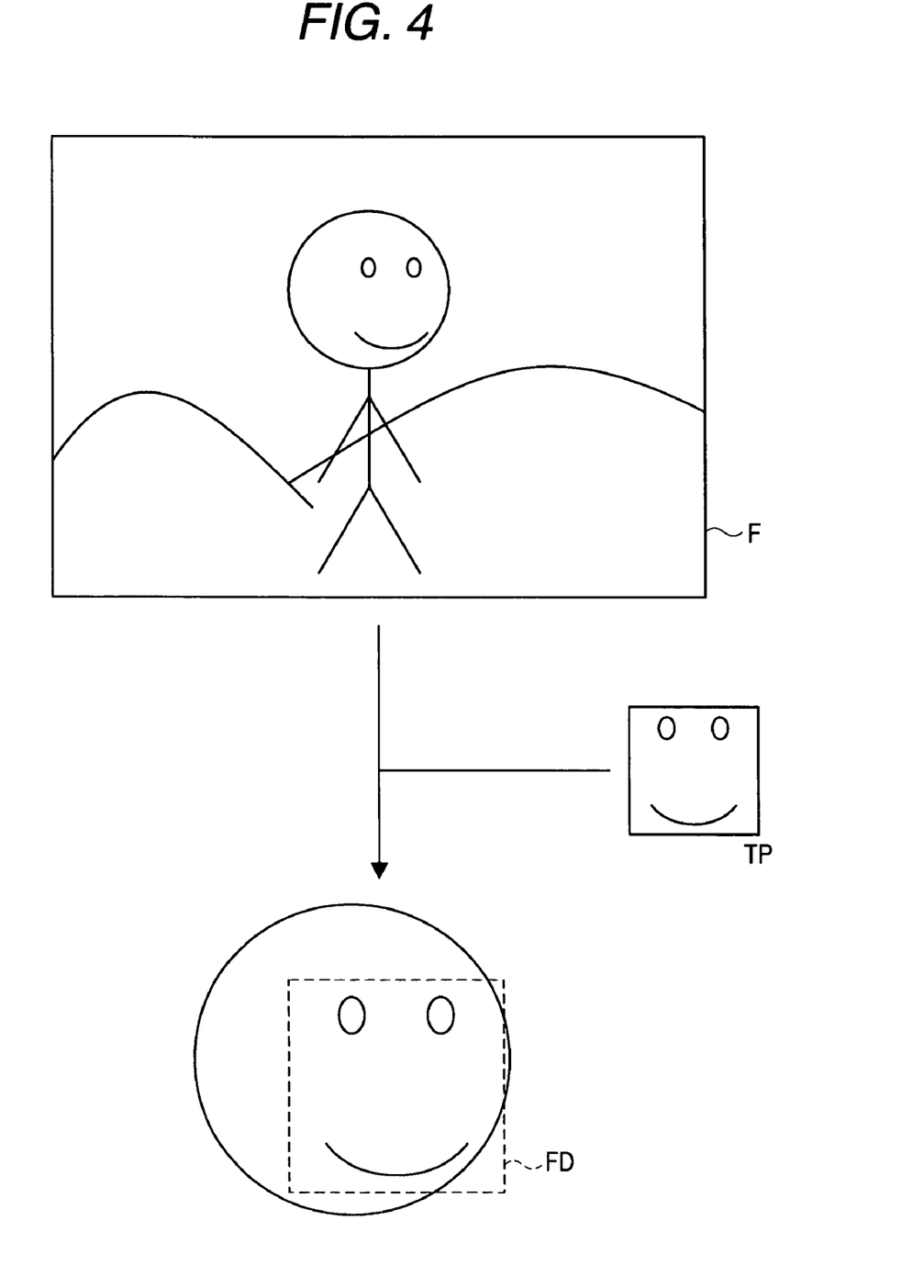
FIG. 4 is a diagram showing how to detect a face region from an input image in the face orientation detecting processing.

In the example of FIG. 4, in the input image F to be processed, an image of a person whose face facing rightward is captured with a mountain as a background. Here, the orientation of the face is oriented rightward means that the face of the person faces rightward. Similarly, the orientation of the face is oriented leftward means that the face of the person faces leftward. Further, as the template TP to be used for detecting the face region, a rectangular image including the parts, such as the eyes and mouth of the face, is used. During template matching, a region having the highest similarity to the template among the image region of the input image F is searched and the face region FD is specified. Since the template TP is the rectangular image including the parts, such as the eyes and mouth, among the human face, the rectangular region including the parts, such as the eyes and mouth, which is the most similar region to the template TP, is acquired as the face region FD.

Next, at Step S2, the first characteristic amount 31 acquires the characteristic amount $R_{FD}$ of the face region. Here, the CPU 10 reads out image data of the face region FD from the RAM 11 and first converts read image data into the hue H of the HSV colorimetric system. For example, if image data is RGB data, the hue H can be calculated by the following equations.

$$cmax = max(R, G, B) \quad (1)$$

$$cmin = min(R, G, B) \quad (2)$$

$$H = 60 \frac{G - B}{cmax(cmax - cmin)} \quad (3)$$

$$H = 60\left[2 + \frac{B - R}{cmax(cmax - cmin)}\right] \quad (4)$$

-continued $$H = 60\left[4 + \frac{R - G}{cmax(cmax - cmin)}\right] \quad (5)$$

Here, R is a red pixel value, G is a green pixel value, B is a blue pixel value, "max" is a function that returns the maximum among the arguments, and "min" is a function that returns the minimum among the arguments. If the value of cmax is R, the hue H can be calculated by the equation (3). If the value of cmax is G, the hue H can be calculated by the equation (4). If the value of cmax is B, the hue H can be calculated by the equation (5).

The hue H calculated by each of the equations (1) to (5) is represented by a hue angle ranging from 0 to 360 degrees. For example, the hue angle 0 degrees represents red and the hue angle 120 degrees represents green. Here, the first characteristic amount calculator 31 sets the characteristic amount $R_{FD}$ of the face region FD as the modal value of the hue in the face region FD. For this reason, the first characteristic amount calculator 31 counts an appearance frequency of the hue H of the face region FD and acquires the value of the hue H having the maximum appearance frequency, that is, the modal value, as the characteristic amount $R_{FD}$ of the face region.

Figure 5:
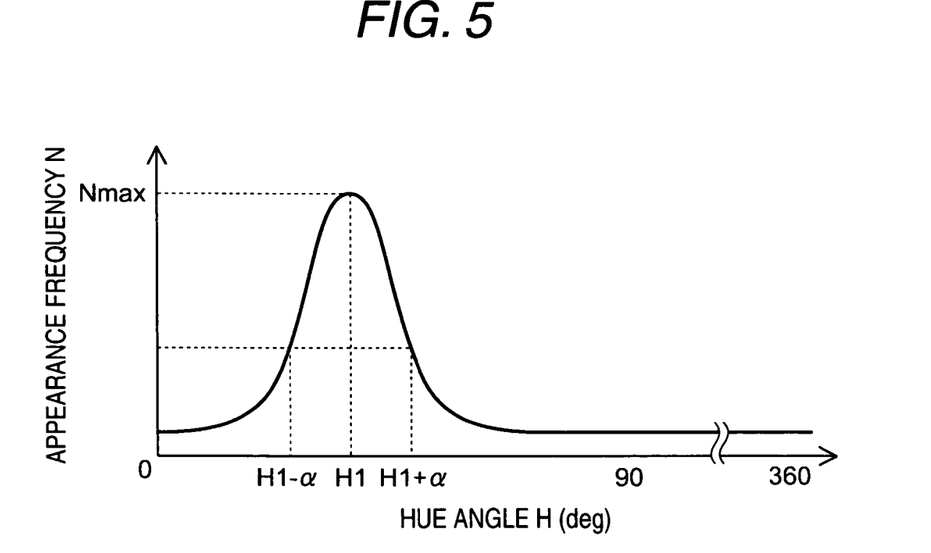
FIG. 5 is a diagram showing an appearance frequency of a hue H in the face region is represented by a histogram.

As shown in FIG. 5, the appearance frequency N of the hue H in the face region FD can be represented by a histogram. In the histogram, a peak of the appearance frequency N exists around a hue angle 6 to 42 degrees corresponding to a flesh color. Further, in the histogram, the modal value of the hue H (H1 in the example of FIG. 5) when the appearance frequency N becomes the maximum value Nmax is set to the characteristic amount $R_{FD}$ of the face region. The CPU 10 calculates the appearance frequency of the pixel on the hue H converted by each of the equations (1) to (5) and stores the value of the hue H having the maximum appearance frequency in the RAM 11 as the characteristic amount $R_{FD}$ of the face region.

The characteristic amount $R_{FD}$ of the face region FD is not limited to the modal value. Alternatively, an average value of hues of image data included in the face region FD may be set to the characteristic amount $R_{FD}$.

Next, at Step S3, the face orientation detection provider 32 sets the rightward detecting region RD and the leftward detecting region LD. Here, the orientation detecting regions on the left and right sides with respect to the face region FD are set according to the position and size of the face region FD.

Figure 6:
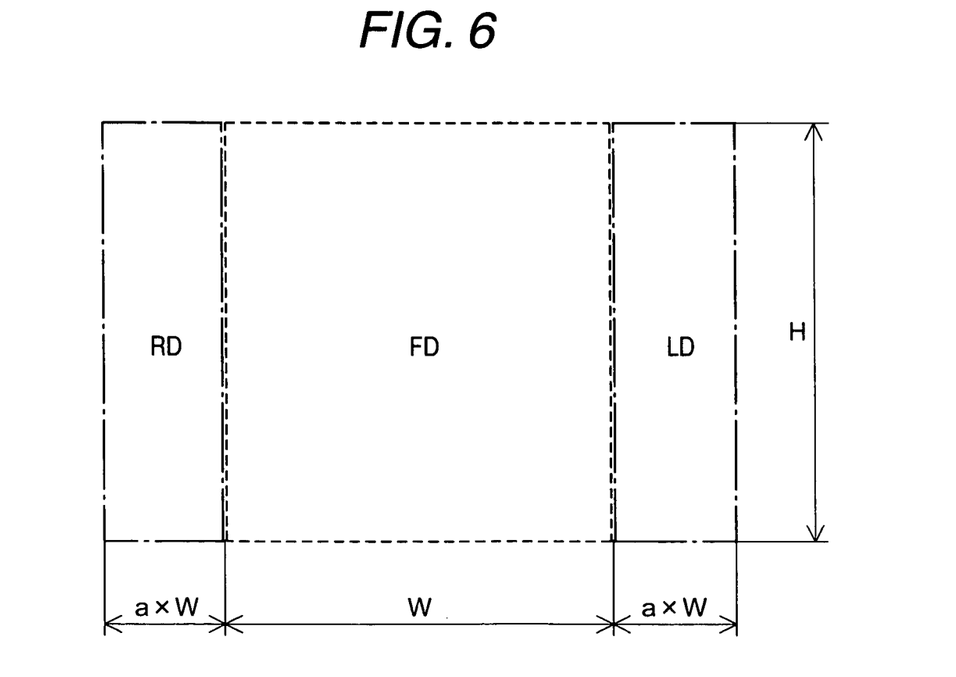
FIG. 6 is a diagram showing how to provide orientation detecting regions in the face orientation detecting processing.

In FIG. 6, the face region is indicated by a dashed line. Further, the rightward detecting region RD and the leftward detecting region LD set on the left and right sides of the face region FD are indicated by chain lines. In order to set the orientation detecting regions, first, as shown in FIG. 6, the size of the face region FD having a rectangular shape where the number of pixels in a horizontal direction is W and the number of pixels in a vertical direction is H is acquired. The rectangular region has the size having a predetermined ratio (in the example of FIG. 6, a times) with respect to the number of pixels W of the face region FD in the horizontal direction. Further, the rightward detecting region RD is set such that one side on the right side thereof comes into contact with the left side of the face region FD. The leftward detecting region LD is set such that one side on the left side thereof comes into contact with the right side of the face region FD. That is, as shown in FIG. 6, the leftward detecting region LD and the rightward detecting region RD serving as the orientation detecting regions are disposed with the face region. FD interposed therebetween in the horizontal direction. The CPU 10 stores region information of the set orientation detecting regions in the RAM 11 so as to set the orientation detecting regions.

Next, at Step S4, the number of pixels having a value dose to the characteristic amount $R_{FD}$ of the face region in each orientation detecting region is calculated. Here, the second characteristic amount calculator 33 detects the number of pixels where the hue H has a value close to the characteristic amount $R_{FD}$ of the face region in each orientation detecting region and sets the detected number of pixels as the characteristic amount of the orientation detecting region. That is, in the rightward detecting region RD, the number of pixels having the hue H which satisfies the following equation is calculated, such that the characteristic amount $R_{RD}$ of the rightward detecting region RD is calculated. Similarly, the characteristic amount $R_{LD}$ of the leftward detecting region LD is also calculated.

Actually, the CPU 10 reads out the characteristic amount $R_{FD}$ of the face region calculated at Step S2 from the RAM 11 and judges whether or not each pixel satisfies the following equation (6) for the rightward detecting region RD and the leftward detecting region LD. Then, the number of pixels that satisfy the equation (6) and are judged to be close to the characteristic amount RFD of the face region are stored in the RAM 11 as the characteristic amounts $R_{RD}$ and $R_{LD}$. Here, α is a predetermined threshold value.

$$R_{FD}-\alpha \leq H \leq R_{FD}+\alpha \tag{6}$$

Next, at Step S5, the face orientation judge 34 judges whether or not the characteristic amount $R_{RD}$ or the characteristic amount $R_{LD}$ is larger than a threshold value β. In this embodiment, the prescribed number of pixels is set to the threshold value β. Alternatively, the threshold value β may vary according to the number of pixels included in the face region FD or the number of pixels in the orientation detecting region. If one of the characteristic amount $R_{RD}$ and the characteristic amount $R_{LD}$ is larger than the threshold value (Yes), it is judged that the orientation detecting region is dose to the hue of the characteristic amount $R_{FD}$ of the face region, and then the process proceeds to Step S6. When both the characteristic amount $R_{RD}$ and the characteristic amount $R_{LD}$ are smaller than the threshold value β (No), it is judged that the orientation detecting region is close to the hue of the characteristic amount $R_{FD}$ of the face region, and then the process proceeds to Step S10.

At Step S6, the face orientation judge 34 judges whether or not the ratio ($R_{LD}/R_{RD}$) of the characteristic amount $R_{LD}$ to the characteristic amount $R_{RD}$ is larger than a predetermined threshold value γ. When the ratio of the characteristic amount $R_{LD}$ to the characteristic amount $R_{RD}$ is larger than the threshold value γ (Yes), it is judged that the leftward detecting region LD is closer to the hue of the face region FD than the rightward detecting region RD does, and then the process proceeds to Step S7. If the ratio is equal to or less than the predetermined threshold value γ (No), the process proceeds to Step S8.

At Step S7, the face orientation judge 34 judges that the face is oriented leftward. The CPU 10 stores, in the RAM 11, information purporting that the face is oriented leftward, and then the process proceeds to Step S11.

If the process proceeds from Step S6 to Step S8, the face orientation judge 34 judges whether or not the ratio ($R_{RD}/R_{LD}$) of the characteristic amount $R_{RD}$ to the characteristic amount $R_{LD}$ is larger than the threshold value γ. If the ratio of the characteristic amount $R_{RD}$ to the characteristic amount $R_{LD}$ is larger than the threshold value γ (Yes), it is judged that the rightward detecting region RD is doser to the hue of the face region FD than the leftward detecting region LD does, and then the process proceeds to Step S9. If the ratio is equal to or less than the predetermined threshold value γ (No), the process proceeds to Step S10.

At Step S9, the face orientation judge 34 judges that the face is oriented rightward. The CPU 10 stores, in the RAM 11, information purporting that the face is oriented rightward, and then the process proceeds to Step S11.

If the process proceeds from Step S5 or Step S8 to Step S10, the face orientation judge 34 judges that the face is oriented forward. The CPU 10 stores, in the RAM 11, information purporting that the face is oriented forward, and then the process proceeds to Step S11.

Figure 7A:
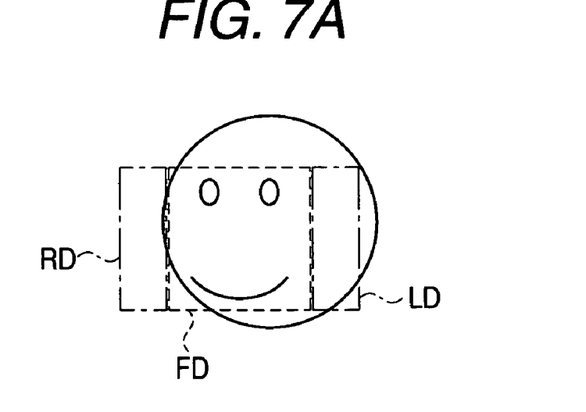
FIGS. 7A to 7C are diagrams showing how to judge the face orientation in the face orientation detecting processing.
Figure 7B:
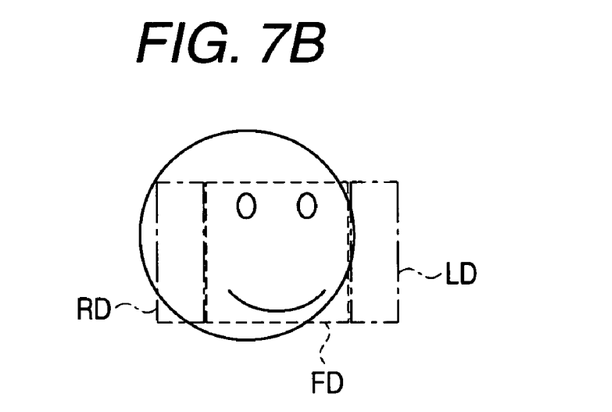
Figure 7C:
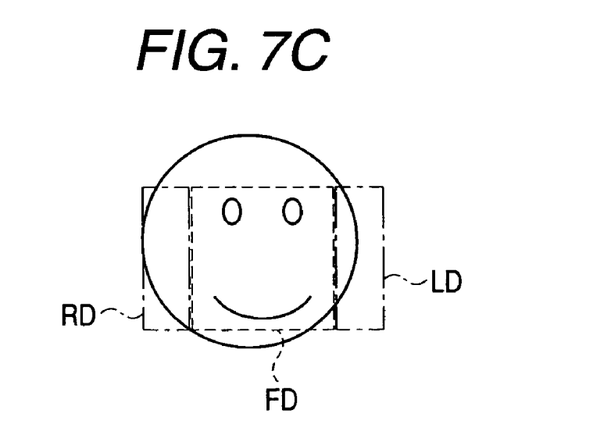

FIGS. 7A to 7C are diagrams illustrating the face orientation judgment by Steps S5 to S10. Specifically, FIG. 7A illustrates an example when the face is oriented leftward, FIG. 7B illustrates an example when the face is oriented rightward, and FIG. 7C illustrates an example when the face is oriented forward.

First, a description will be given for FIG. 7A. In this case, since the face is oriented leftward, when the face region FD is the full face, the leftward detecting region LD is disposed on the region of the side of a head portion. Therefore, the leftward detecting region LD includes a region that has a flesh color, such as a cheek, from the lateral side of the face. Meanwhile, the rightward detecting region RD is set such that most of the region is disposed outside the outline of the face. In this case, since the characteristic amount $R_{LD}$ of the leftward detecting region LD is larger than the characteristic amount $R_{RD}$ of the rightward detecting region RD, it is judged at Step S6 that the face is oriented leftward.

In FIG. 7B, since the face is oriented rightward, as shown in the drawing, the rightward detecting region RD is disposed on a region that has a flesh color, such as a cheek, from the lateral side of the face. Meanwhile, the leftward detecting region LD is set such that most of the region is disposed outside the outline of the face. In this case, since the characteristic amount $R_{RD}$ of the rightward detecting region RD is larger than the characteristic amount $R_{LD}$ of the leftward detecting region LD, it is judged at Step S9 that the face is oriented rightward.

In FIG. 7C, since the face is oriented forward as shown in the drawing, both the rightward detecting region RD and the leftward detecting region LD are disposed on a region that has a flesh color, such as a cheek, from the lateral side of the face. For example, the rightward detecting region RD includes the region, such as a cheek, from the lateral side of the face, and also the leftward detecting region LD includes a region on the opposing lateral side of the face. In this case, since both the characteristic amount $R_{RD}$ of the rightward detecting region RD and the characteristic amount $R_{LD}$ of the leftward detecting region LD are large, the values of $R_{RD}/R_{LD}$ and $R_{LD}/R_{RD}$ become smaller than the threshold value γ. Then, it is judged at Step S10 that the face is oriented forward.

If the orientation of the face is judged, at Step S11, the image trimmer 35 obtains a trimmed image TF from the input image F according to the judged orientation of the face. The trimmed region is set such that a region from the position of the face in a direction of the orientation of the face is secured to have a sufficient size. Specifically, the trimmed image TF is trimmed such that a region, to which the face is oriented, becomes large in a pattern selected by a user among a plurality of prescribed patterns having different compositions. The CPU 10 performs trimming processing on image data of the input image F according to the information representing the orientation of the face read out from the RAM 11, outputs the trimmed image TF to the information output device, such as the liquid crystal display 21, through the output I/F 15, and performs a processing for displaying a user interface screen including the trimmed image TF.

Figure 8A:
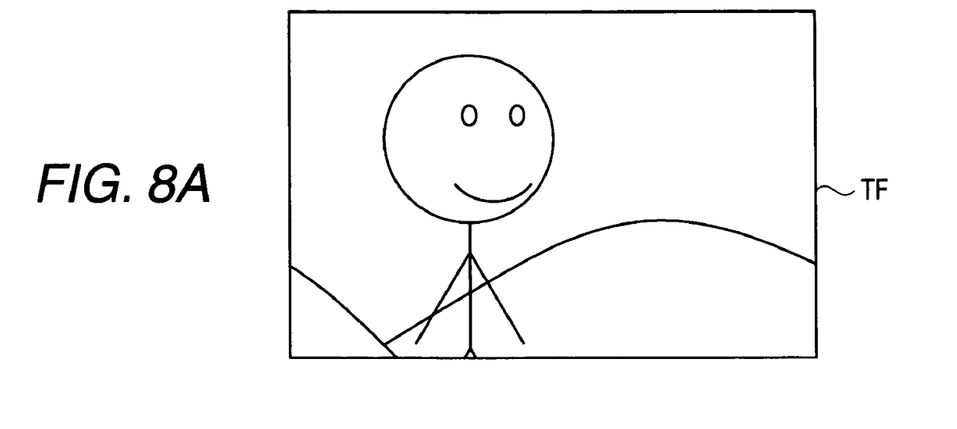
FIGS. 8A to 8C are diagrams showing examples of a trimmed image obtained in accordance with the judged face orientation.
Figure 8B:
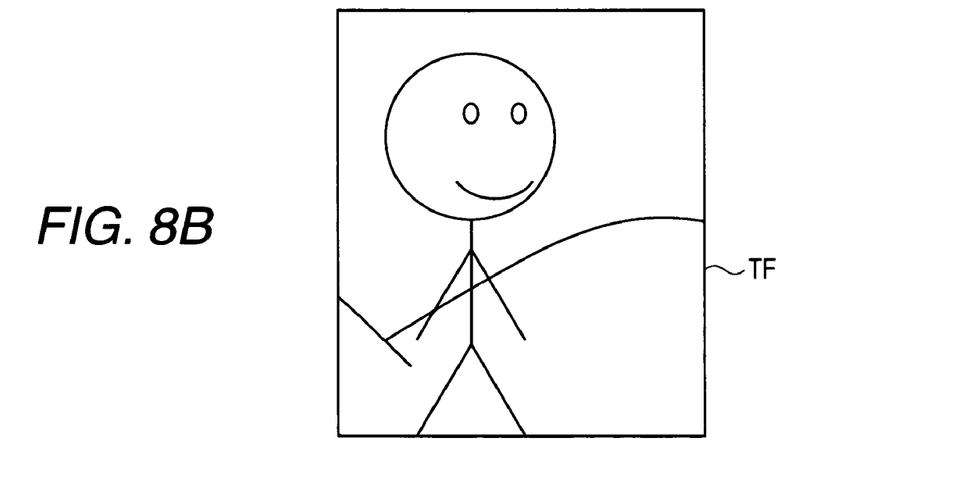
Figure 8C:
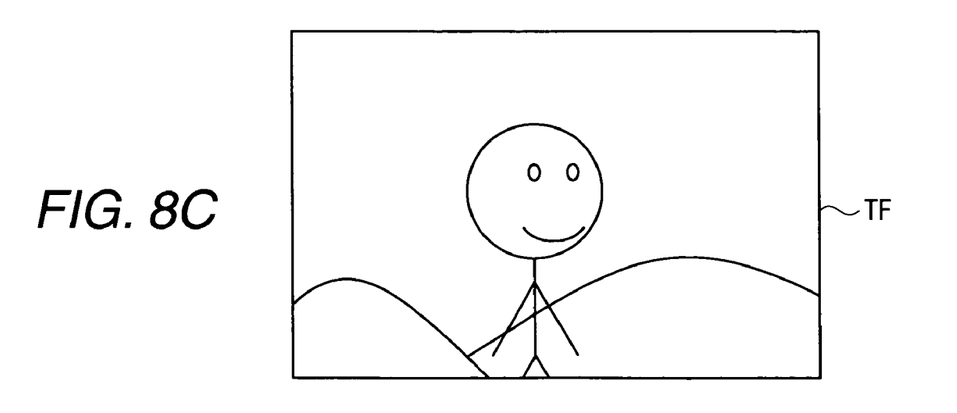

FIG. 8A shows a trimmed image TF when a horizontally elongated rectangular shape is trimmed. Trimming is performed such that the ratio of the sizes of the regions on the lefthand right sides of the face region FD and the ratio of the upper and lower portions becomes a predetermined ratio. As the predetermined ratio, the golden ratio may be used, which makes it possible to obtain a suitable composition. FIG. 8B shows a brimmed image TF when a vertically elongated rectangular shape is trimmed. Further, as shown in FIG. 8C, the pattern of a composition may be trimmed from a reduced image. As such, the image trimmer 35 performs trimming according to the patterns of various compositions. The patterns are not limited to those shown in FIGS. 8A to 8C. For example, a pattern having a composition where the conditions, such as a trimmed size, a trimmed position, a trimmed shape are changed may be used.

Figure 9:
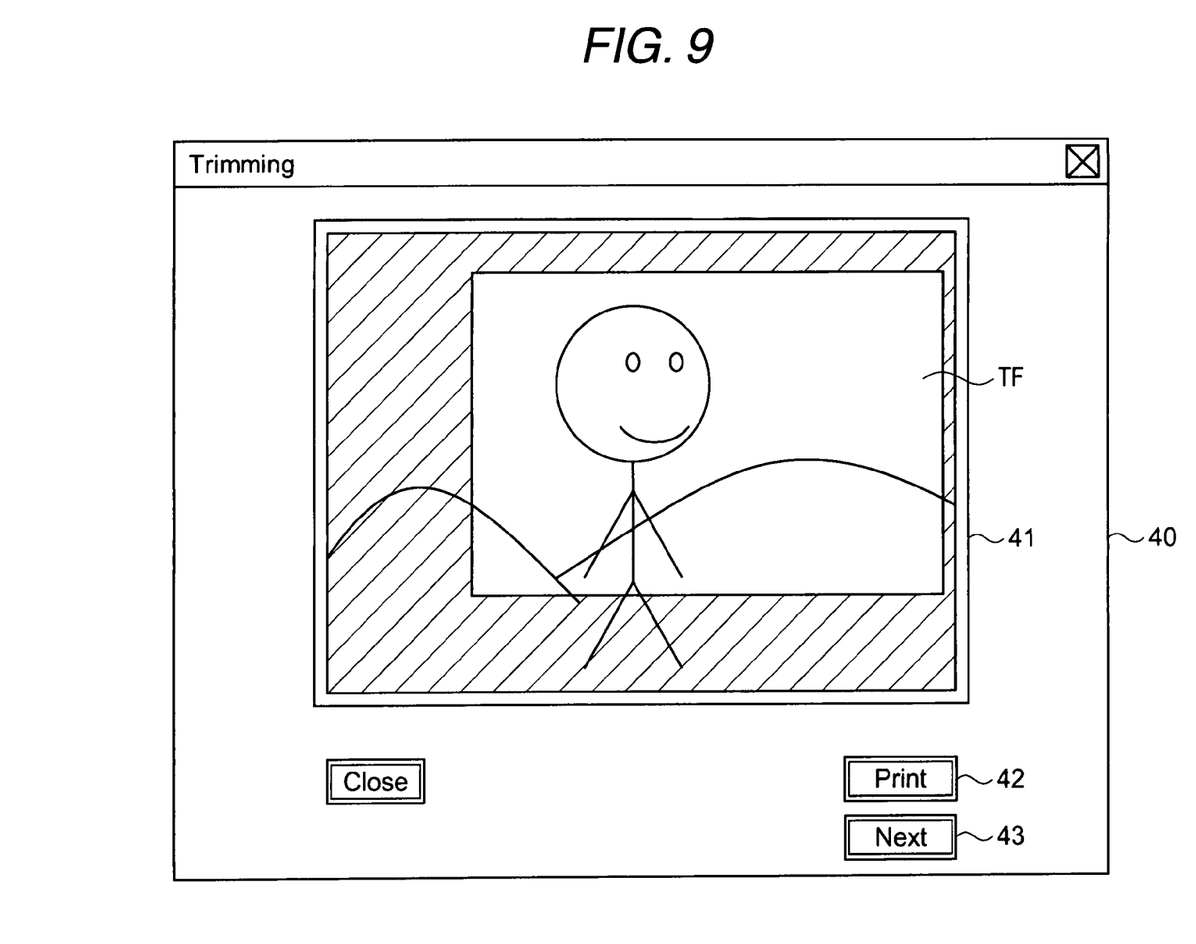
FIG. 9 is a diagram showing a user interface screen that is displayed on a liquid crystal display in the image processing system.

FIG. 9 shows a user interface screen 40 that is displayed on the liquid crystal display 21. There is shown an example when trimming is performed on the input image F shown in FIG. 4. An image displaying region 41, a print button 42, a next candidate selecting button 43, and so on are displayed on the user interface screen 40. On the image displaying region 41, the input image F acquired by image capturing the person whose face is oriented rightward with respect to the screen is displayed. An image region excluding the trimmed image TF of the image region of the input image F is indicated by a hatched region so as to emphasize the image region of the trimmed image TF. In the example of FIG. 9, since the face is oriented rightward, a region on the right side on the basis of the parts of the face becomes large, such that an image of the composition according to the orientation of the face is displayed.

If the print button 42 is pressed in a state where the image is displayed on the image displaying region 41, image data of the trimmed image TF is transmitted to the printer 23, such that the trimmed image TF can be printed. If the next candidate selecting button 43 is pressed, an image trimmed under a different condition is displayed. A trimmed image TF that is just trimmed according to the pattern of a different composition among the plurality of patterns having different compositions is displayed. For example, whenever the next candidate selecting button 43 is pressed, each of the trimmed images TF shown in FIGS. 8A to 8C is cut and displayed.

As described above, according to the face orientation detecting apparatus 2 of this embodiment, the orientation of the face of a subject from the input image F can be detected, and the trimmed image TF having the composition according to the orientation of the face can be output.

Since the orientation of the face is detected by comparing the sizes of the characteristic amounts $R_{RD}$ and $R_{LD}$ of the orientation detecting regions, it is possible to simply judge the orientation of the face.

Since the number of pixels of the hue close to the characteristic amount $R_{FD}$ of the face region is set to the characteristic amount $R_{RD}$ or $R_{LD}$ of the orientation detecting region, it is possible to properly judge the orientation of the face according to the color of the face region of the person as the subject.

There is no need to calculate the similarity to the plurality of inclined face images in order to detect the orientation of the face. Accordingly, the amount of calculation can be reduced, as compared with the conventional techniques. Therefore, a processing speed is improved.

Since the face region FD is acquired from the image, even though the background around the face in the image has the color close to the face, it is possible to accurately detect the orientation of the face.

Since the trimmed image TF is trimmed from the input image F according to the orientation of the face, it is possible to obtain an image having an excellent composition.

Since the orientation detecting region is set on the basis of the face region FD, the orientation of the face can be detected, regardless of the size of the face region FD. Therefore, it is possible to cope with images captured at various magnifications or images having different resolution.

On the user interface screen 40, when the next candidate selecting button 43 is pressed, the trimmed image TF is switched into a trimmed image TF having another composition pattern. Therefore, it is possible for the user to easily obtain a trimmed image having a desired composition.

Although the embodiment of the invention has been described, the invention is not limited to the above-described configuration. Hereinafter, modifications of the invention will be described.

In the embodiment described above, the modal value of the hue H of the pixel included in the face region FD is used as the characteristic amount $R_{FD}$. However, the number of pixels where the hue H is within the range of a hue angle corresponding to the flesh color of a person may be used as the characteristic amount $R_{FD}$. For example, the number of pixels where the hue H falls within a hue angle of 6 to 42 degrees corresponding to the flesh color and the condition G>B is satisfied may be counted and then the counted number of pixels may be set to the characteristic amount $R_{FD}$ of the face region.

In the embodiment described above, the number of pixels where the hue H is converged within a predetermined range ($\pm \alpha$) from the modal value using the equation (6) is used as the characteristic amount $R_{RD}$ or $R_{LD}$ of the orientation detecting region. However, the number of pixels that are within the range of a confidence section of the hue H in a distribution of the hue H of the face region FD may be used as the characteristic amount $P_{RD}$ or $R_{LD}$. For example, when the 80% confidence section is used, the value of $\alpha$ is calculated such that 80% pixels of all pixels are converged within a range of H1±$\alpha$ around a hue H1 having the maximum appearance frequency. In this case, it is possible to properly detect the orientation of the face according to the images.

Figure 10:
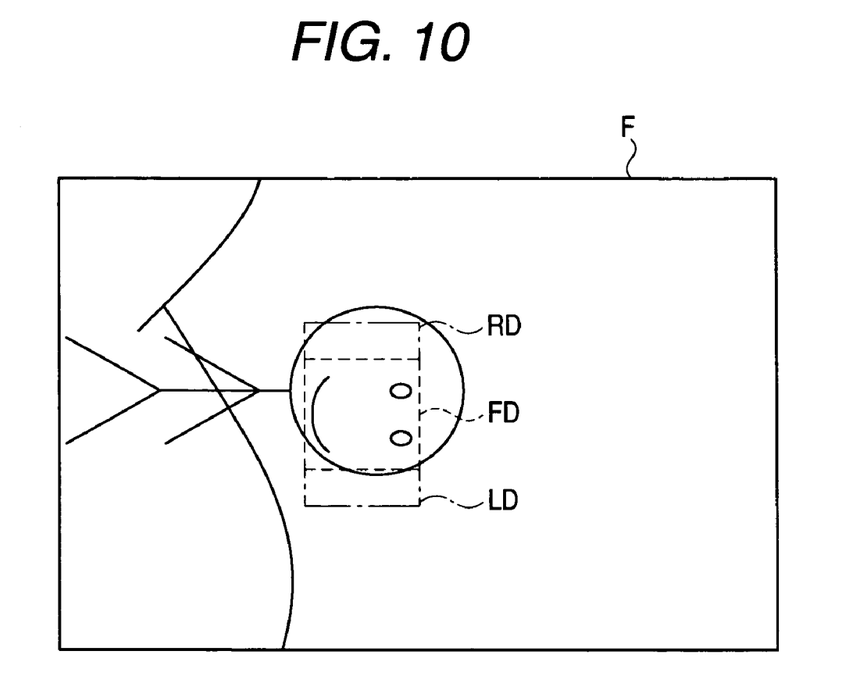
FIG. 10 is a diagram showing how to provide the orientation detecting regions, according to one of modified examples of the embodiment.

In the embodiment described above, the orientation of the face is judged for the left and right sides of the face region FD. However, when an image is captured by a camera at a landscape position, the orientation detecting regions RD and LD are set on the left and right sides with respect to the orientation of the captured face. As shown in FIG. 10, in an image captured by the camera at the landscape position, the person may be captured in a landscape orientation. In this case, the orientation of the camera during image capturing is judged by referring to Exif information, which represents a image capturing direction given to image data, so that the orientation detecting regions RD and LD are set on upper and lower sides of the face region FD. With this configuration, it is possible to properly the orientation of the face for the image captured by the camera in the changed orientation.

Figure 11:
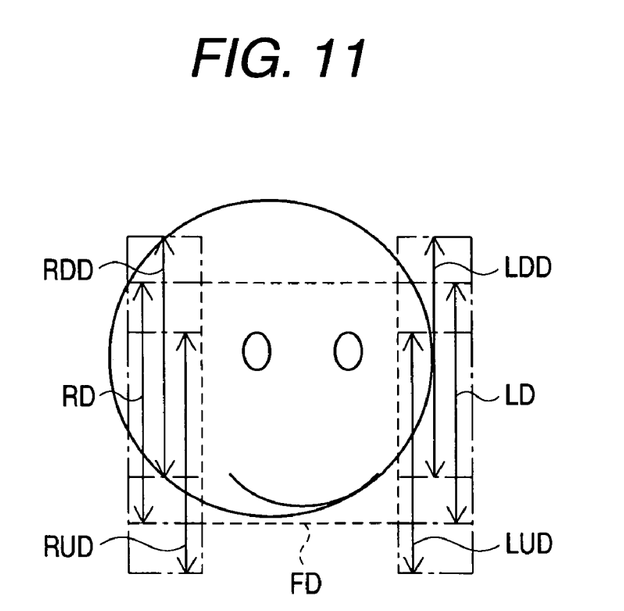
FIG. 11 is a diagram showing how to provide the orientation detecting regions, according to another one of modified examples of the embodiment.

In the embodiment described above, an example of a case where the orientation of the face is judged relative to the left and right sides is described. However, an oblique orientation may be detected according to positions where the orientation detecting regions are set. For example, as shown in FIG. 11, a down-rightward detecting region RDD that is positioned an upper side of the rightward detecting region RD, and an up-rightward detecting region RUD that is positioned a lower side of the rightward detecting region RD are set on the right side of the face region FD. Further, a down-leftward detecting region LDD that is positioned an upper side of the leftward detecting region LD, and an up-leftward detecting region LUD that is positioned a lower side of the leftward detecting region LD are set on the right side of the face region FD. With this configuration, for example, when the face is oriented down-rightward as shown in FIG. 11, the characteristic amount of the orientation detecting region in the up-rightward detecting region RUD becomes large. Therefore, it is possible to detect that the orientation of the face is down-rightward.

With simplification of the processing in the embodiment described above, the number of pixels that are within the range of an angle of the hue H corresponding to the flesh color (for example, pixels where the hue H ranges 6 to 42 degrees and the pixel value of G becomes larger than the pixel value of B) or the average of the hues H in the orientation detecting region RD or LD may be calculated as the characteristic amount $R_{RD}$ or $R_{LD}$ of the orientation detecting region. Then, the orientation of the face can be judged by comparing the characteristic amounts $R_{RD}$ and $R_{LD}$. In such a manner, the orientation of the face can be judged, without using the characteristic amount $R_{FD}$ of the face region FD, and thus the processing can be performed at a higher speed.

In the embodiment described above, the orientation of the face is judged from leftward, rightward, and forward. However, the orientation of the face may be expected by the method according to the embodiment of the invention. Therefore, the number of inclined face images to be created in the conventional techniques can be reduced. As a result, it is possible to accurately the orientation of the face and also to reduce a processing amount.

Figure 12:
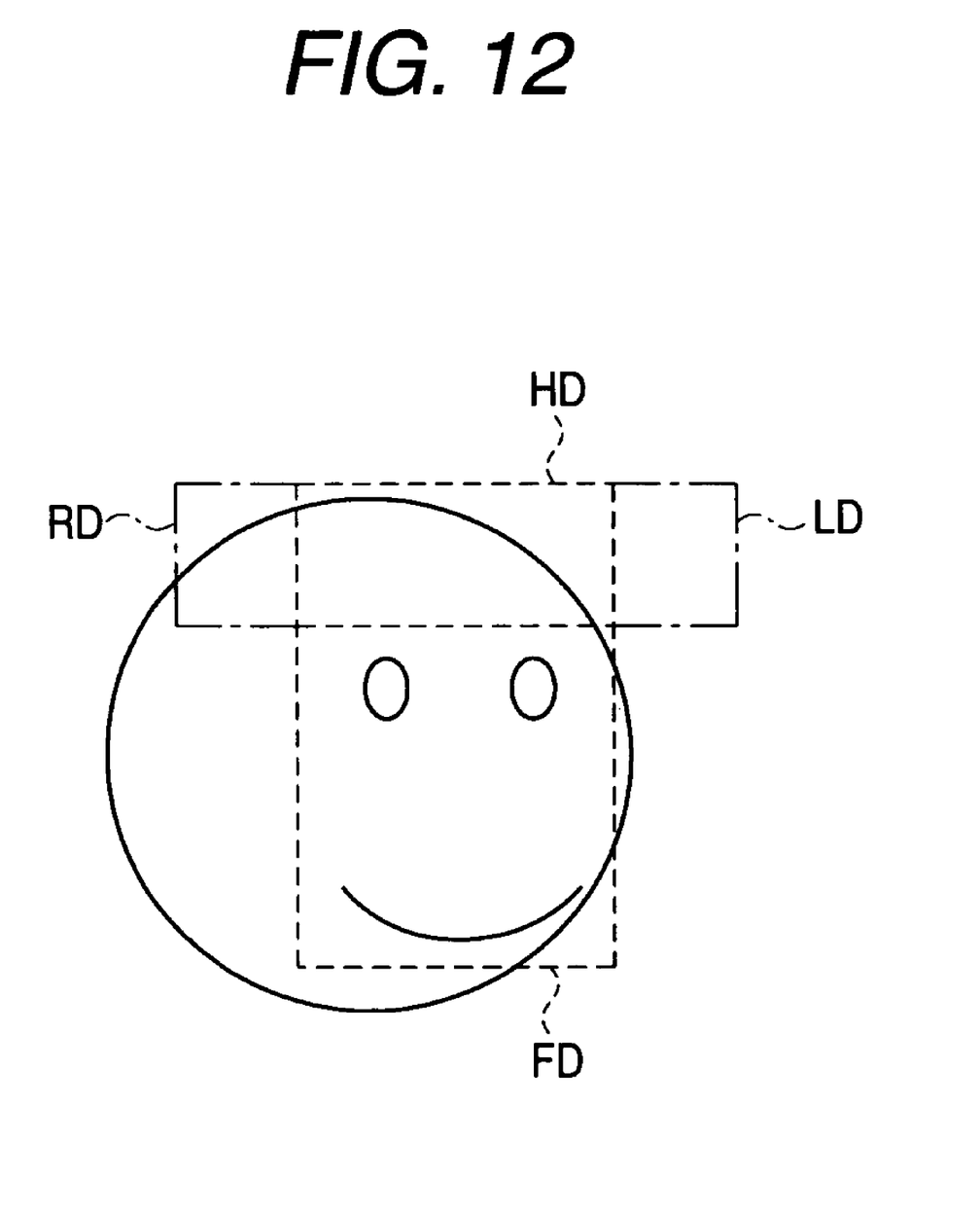
FIG. 12 is a diagram showing how to provide the orientation detecting regions, according to another one of modified examples of the embodiment.

As shown in FIG. 12, on an assumption that a hair region HD on an upper side than the detected face region FD may be set, and the rightward detecting region RD and the leftward detecting region LD may be set on the left and right sides of the hair region HD. In this case, a hue in the hair region or the number of pixels that are close to black are set to the characteristic amount $R_{RD}$ of the rightward detecting region RD or the characteristic amount $R_{LD}$ of the leftward detecting region LD, such that the orientation of the face can be detected. Further, even though the input image is a monochrome image, it is possible to properly detect the orientation of the face.

In the embodiment described above, the number of pixels that satisfy the condition of the equation (6) in the orientation detecting region, that is, an area value is used as the characteristic amount $R_{LD}$ or $R_{RD}$. However, the number of pixels that are arranged in a widthwise direction of the orientation detecting region and satisfy the condition of the equation (6) may be used as the characteristic amount $R_{LD}$ or $R_{RD}$. That is, a length value in the widthwise direction satisfying the condition (6) may be used as the characteristic amount.

In the embodiment described above, as the face orientation detecting apparatus 2, the configuration in which the general-use computer 1 judges the orientation of the face of the subject is described. The individual parts of the face orientation detecting apparatus 2 may be incorporated into an electronic device, such as a digital still camera, a digital video camera, or the like. In this case, these electronic devices can be used as the face orientation detecting apparatus.

In the embodiment described above, the CPU 10 executes the application program as the face orientation detecting program and the processing is implemented by software so as to cause the computer 1 to function as the face orientation detector 30, the first characteristic amount calculator 31, the face orientation detection provider 32, the second characteristic amount calculator 33, the face orientation judge 34, and the image trimmer 35. However, the configuration of the face orientation detecting apparatus 2 described above may be implemented by hardware circuits, such as an ASIC. Of course, some functions may be implemented by the hardware circuits, and the functions that cannot be implemented by the hardware circuits may be implemented by software.

What is claimed is:

1. A method of detecting an orientation of a human face included in an image comprised of a plurality of pixels, comprising:
   causing an imaging device to take an image;
   determining a face region within the image, the face region including the human face and having a first dimension in a width direction and a second dimension in a height direction orthogonal to the width direction;
   setting a plurality of detecting regions within the image, at least two of the detecting regions being adjacent to the face region and having a third dimension in the width direction and the second dimension in the height direction;
   acquiring a first amount indicative of a hue of the face region;
   acquiring a plurality of second amounts each of which is a hue of one of the two detecting regions with reference to the first amount; and
   comparing the second amounts to each other to judge the orientation.

2. The method as set forth in claim 1, wherein each of the second amounts is acquired by number of pixels having a color component.

3. The method as set forth in claim 1, wherein the orientation is detected with reference to one of the detecting regions having the largest one of the second amounts.

4. The method as set forth in claim 1, wherein the face region is placed between the detecting regions.

5. The method as set forth in claim 4, further comprising:
   determining whether a ratio of the second amounts is less than a threshold value,
   wherein it is detected that the human face is oriented forward when the ratio is less than the threshold value.

6. The method as set forth in claim 1, wherein the detecting regions are set with reference to a size of the face region.

7. The method as set forth in claim 1, further comprising:
   trimming a part of the image which is determined in accordance with the judged orientation.

8. A program product comprising a recording medium having recorded thereon a computer-readable program operable to cause a computer to execute the method as set forth in claim 1.

9. The method as set forth in claim 1, further comprising:
   determining a hair region within the image, the hair region being disposed at an upper side of the human face included in the face region;
   determining a plurality of the detecting regions adjacent to the hair region;
   acquiring a third amount indicative of a hue of the hair region;
   acquiring a plurality of fourth amounts each of which is a hue of one of the detecting regions adjacent to the hair region with reference to the third amount; and
   comparing the fourth amounts to each other to judge the orientation.

10. An apparatus to detect an orientation of a human face included in an image comprised of a plurality of pixels, comprising:
    a face region detector, operable to determine a face region within the image, the face region including the human face and having a first dimension in a width direction and a second dimension in a height direction orthogonal to the width direction;

a detecting region provider, operable to set a plurality of detecting regions within the image, at least two of the detecting regions being adjacent to the face region and having a third dimension in the width direction and the second dimension in the height direction;

a calculator, operable to acquire a first amount indicative of a hue of the face region, and to acquire a plurality of second amounts each of which is a hue of one of the detecting regions with reference to the first amount; and a judge, operable to compare the second amounts to each other to judge the orientation.

* * * * *